United States Patent [19]
Klubovich et al.

[11] 4,453,392
[45] Jun. 12, 1984

[54] METHOD OF HARDENING SHAPED SURFACES BY PLASTIC DEFORMATION

[75] Inventors: Vladimir V. Klubovich; Gennady S. Basenok, both of Vitebsk; Leonid K. Konyshev, Minsk; Valery A. Sidorenko, Minsk; Anatoly K. Gleb, Minsk; Anatoly M. Zinder, Vitebsk; Mikhail N. Konnikov, Vitebsk; Boris E. Gorelik, Vitebsk, all of U.S.S.R.

[73] Assignee: Fiziko-Tekhnichesky Institut Akademii Nauk Belorusskoi SSR, Minsk, U.S.S.R.

[21] Appl. No.: 377,089

[22] Filed: May 11, 1982

[51] Int. Cl.³ ............................................. B21F 35/00
[52] U.S. Cl. ................................... 72/75; 72/710; 140/89
[58] Field of Search ........... 140/89; 29/173, DIG. 49; 72/75, 77, 78, 135, 137, 362, 710

[56] References Cited

U.S. PATENT DOCUMENTS 3,735,615  5/1973  Shneider ................................ 72/75

FOREIGN PATENT DOCUMENTS 45-9867   4/1970   Japan ........................................ 72/75
536874    2/1976   U.S.S.R. .................................. 72/710
878546   11/1981   U.S.S.R. .

Primary Examiner—Lowell A. Larson
Attorney, Agent, or Firm—Lilling & Greenspan

[57] ABSTRACT

A method of hardening by plastic deformation surfaces of articles shaped as continuous helical coils and having essentially round cross-section by means of deforming elements wherein said deforming elements are arranged at the opposite sides of said article for forced rotation in engagement with the surface of the material of said article, while said article is rotated about its longitudinal centerline and subjected to ultrasonic oscillations. The deforming elements are rotated in opposite directions so as to form on the surface of said article a regular microrelief in the form of an intersecting mesh-like pattern. By changing the ratio between the angular rotational velocities of the deforming elements, a microrelief of desired geometry is attained.

1 Claim, 5 Drawing Figures

METHOD OF HARDENING SHAPED SURFACES BY PLASTIC DEFORMATION

FIELD OF THE INVENTION

This invention relates to the art of surface hardening by plastic deformation of machine parts having complex shaped surfaces, particularly surfaces of articles in the form of continuous helical coils.

The invention can find application for surface hardening articles in the form of continuous helical coils with turns thereof being substantially round in cross-section.

BACKGROUND OF THE INVENTION

A major performance characteristic of a coil spring is, as is known, its resistance to fatigue failure, such a resistance providing long working life under cyclic stresses. Fatigue life of springs is considerably shortened by scratches, notches, microcracks and other surface irregularities, this becoming even more pronounced in instances where scratches and cracks coincide in direction with the direction of working loads exerted on the springs. Increased fatigue life is normally attained by surface hardening through the employment of such widely varying techniques as flame treatment, surface impregnation, mechanical or thermomechanical hardening, etc.

At present hardening articles in the form of helical coils made of round wire with uniform degree of surface hardness circumferentially of the coil turn cross-section and low surface roughness poses considerable difficulties. There are known a number of methods of surface hardening springs by plastic deformation.

Widely used in the art is the shotblasting technique, wherein steel or cast iron pellets or balls are thrown at high velocity against the surface of a spring being processed. However, this method is inherently disadvantageous in that a spring thus treated is not uniform in surface hardness circumferentially of a turn thereof and has excessive surface roughness. In consequence, this causes the formation of minute stress concentrations on the surface which reduces the fatigue strength of the spring.

In another known method use is made of loose balls accommodated together with articles, such as screws and springs, in a closed volume and subjected to ultrasonic oscillations, the balls thereby effecting surface hardening of the articles.

However, this method fails to provide a uniform depth of the hardened layer on the surface of articles shaped as continuous helical coils.

SUMMARY OF THE INVENTION

It is therefore an object of this invention to provide a method of surface hardening articles shaped as helical springs and an apparatus for effecting the method which would ensure that a desired depth of hardened surface layer is attained through a certain ratio between a static force applied and ultrasonic oscillations imparted to the article being processed.

Another object is to obtain a desired regular pattern of microrelief on the surface of the article by selecting a corresponding ratio between the rotational velocities of the article and elements effecting plastic deformation to thereby substantially extend the fatigue life of the article.

The objects are attained a method of hardening by plastic deformation surfaces of articles, shaped as continuous helical coils and having essentially round cross-section, by means of deforming elements adapted to engage with the surface of the article. According to the invention, the deforming elements are arranged at the opposite sides of the article for forced rotation to contact the surface of the material of the article. Rotation is provided to the article about its longitudinal centerline while ultrasonic oscillations are imparted thereto. The deforming elements are rotated in opposite directions so as to form on the surface of the article a regular pattern of microrelief in the form of intersecting mesh-like paths, a desired geometry of the microrelief being attained by changing the ratio between the angular rotational velocities of the deforming elements.

Due to its complex helical shape the article is subjected to three types of oscillations, viz. longitudinal, flexural and torsional. The wavelength of each of these oscillations being different and all points of the article shaped as a helical coil are subject to complex oscillations, the total amplitude of each of the coil points being roughly identical. This makes it possible to carry out surface hardening at relatively low static strains exerted on the deforming elements, the latter facilitating smooth rotation of the deforming elements which ensures uniform depth of the hardened surface layer.

BRIEF DESCRIPTION OF THE DRAWINGS

The invention will now be described in greater detail with reference to specific embodiments thereof taken in conjunction with the accompanying drawings, in which.

DETAILED DESCRIPTION OF THE INVENTION

Figure 1:
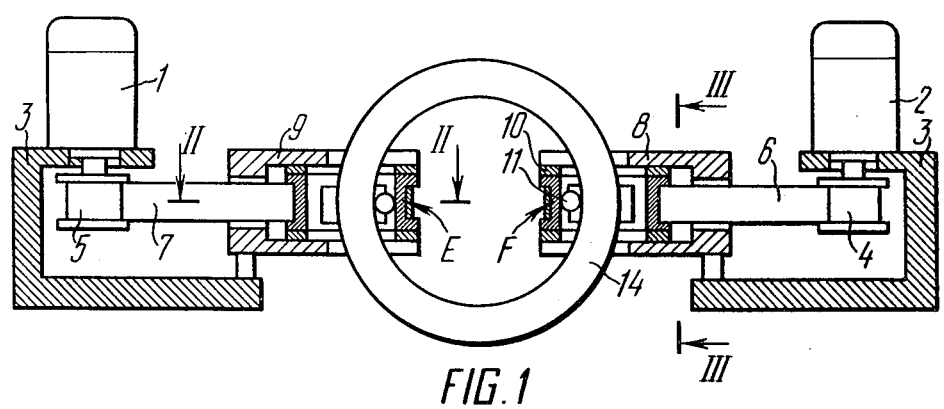
FIG. 1 is a view illustrating how a method of hardening shaped surfaces by plastic deformation according to the invention can be practised.
Figure 2:
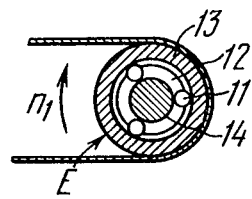
FIG. 2 is a section taken along the line II—II in FIG. 1.
Figure 3:
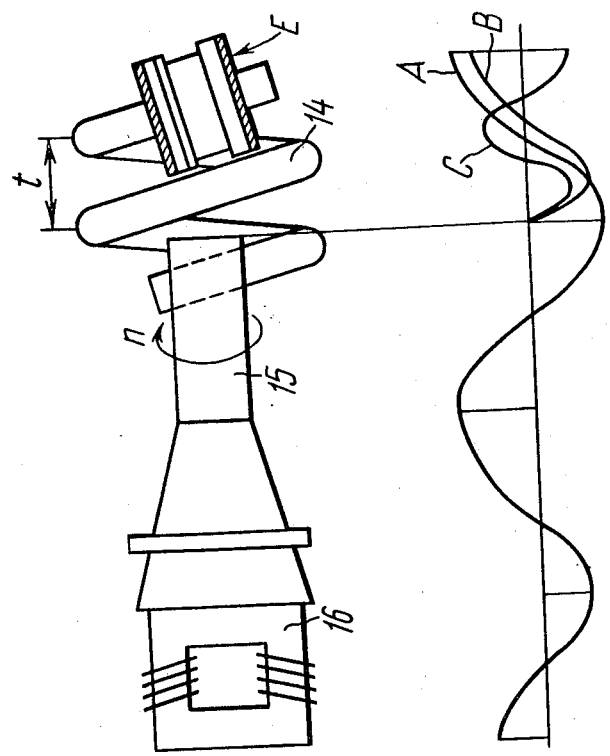
FIG. 3 is a section taken along the line III—III in FIG. 1.

With reference to FIGS. 1 and 2 there is shown diagrammatically an apparatus for hardening by plastic deformation shaped surfaces of articles in the form of continuous helical coils fabricated from materials of substantially round cross-section, while FIG. 3 illustrates a method of surface hardening.

The apparatus comprises two variable-speed electric motors 1 and 2 (FIG. 1) mounted on carriages 3. Pulleys 4 and 5 are secured on the shafts of the electric motors 2 and 1 to transmit rotation through belts 6 and 7 to deforming elements generally indicated by F and E and arranged in shackles 8 and 9. The deforming elements E and F are structurally identical and comprise antifriction spacers 10, balls 11 (FIG. 2), separators 12 and pressure rings 13. A spring 14 to be surface hardened is passed through the deforming elements E and F, the spring 14 being secured at the end of a waveguide 15

(FIG. 3). Another end of the waveguide 15 is fixedly attached to a source 16 of ultrasonic oscillations.

The herein proposed method of hardening shaped surfaces by plastic deformation resides in as follows.

The spring 14 (FIG. 3) is fixed to the end of the waveguide 15. The spring 14 is then threaded through the deforming elements, for example, the element F. The spring 14 is arranged in the deforming element F with a preset tension representing a difference between the cross-sectional diameter of a turn of the spring 14 and the working diameter of the deforming element F. The deforming elements F and E are fitted on the spring 14 in sequence. First, one deforming element, such as the element F is assembled, for which purpose the balls 11 (FIG. 2) are fitted into the separator 12 to be then inserted into the pressure ring 13. The antifriction spacers 10 (FIG. 1) are then installed onto the side surfaces of the pressure ring 13. The spring 14 is thereafter passed through the thus assembled deforming element F, while the drive belt is passed around the pressure ring 13. Ultrasonic oscillations are imparted to the spring 14 from the source 16 of ultrasonic oscillations by way of the waveguide 15, the spring 14 being rotated about its longitudinal centerline at a rate n. Simultaneously, the electric motor 2 acts to transmit rotation to the deforming element F through the pulley 4 and drive belt 6, the element F rotating about the cross-sectional periphery of a turn of the spring at a rate $n_1$ (FIG. 2). When half of the turn of the spring 14 has been processed, the spring 14 is stopped, while the electric motor 2 and the source 16 of ultrasoni oscillations (FIG. 3) are deenergized. This is followed by assembling the second deforming element E on the other side of the spring 14 which is done essentially similarly to what has been described with reference to the deforming element F.

The spring 14 is then again rotated and subjected to ultrasonic oscillations imparted thereto from the source 16 through the waveguide 15. The deforming elements F and E arranged in opposition to each other on the sides of the spring 14 and consequently the balls 11 are rotated by the motors 2 and 1 through the pulleys 4 and 5 and belts 6 and 7 in opposite directions at the rate of rotation $n_2$ and $n_1$, respectively.

For one revolution of the spring 14 each of the deforming elements E or F is displaced circumferentially of a turn of the spring 14 a distance $L=\pi D$, where D is the diameter of the spring, and $\pi=3.14$. Assuming that $S_0$ is the travel of the deforming element, such as the element E, along the spring turn for one revolution of this element about its own axis providing a required microrelief on the spring surface, then $L/S_0$ will represent the number of revolutions $n_1$ of the deforming element for one revolution of the spring 14. In consequence, the rotation rate $n_1$ of the element E exceeds the rate n of rotation of the spring by the same amount.

The deforming elements E and F are adapted by way of the balls 11 to form on the surface of the spring 14 a regular microrelief in the form of intersecting mesh-like paths or patterns; changing the ratio between the angular rotational velocity of the deforming elements E and F provides required geometrical parameters of the microrelief.

For one revolution of the spring 14 about its centerline the carriages 3 with the deforming elements E and F are moved a distance equal to a pitch t of the spring 14 (FIG. 3). When the spring 14 is sufficiently rigid (spring wire diameter more than 5 mm), a special drive for moving the carriages 3 (FIG. 1) can be dispensed with. Arrangement of the carriages 3 on guideways for movement conforming to the longitudinal centerline of the spring 14 makes it possible due to rotation of the spring to provide a component force directed axially of the spring 14. This force will cause the carriages to move along the centerline of the spring 14 to thereby effect spring processing.

As a consequence of the shape of the spring 14 (FIG. 3) three types of oscillations are induced therein when the source of ultrasonic oscillations is actuated, the oscillations being A—longitudinal, B—torsional and C—flexural. Because the wavelength of each of these oscillations is different, all points of the spring 14 are subject to complex ultrasonic oscillations, meaning that the overall amplitude of oscillations in each point of the spring has approximately the same value. The provision of ultrasonic oscillations in every point of the spring 14 augments the plasticity of the spring material being hardened and enhances the dislocating motions which in turn brings down the forces required for plastic deformation to take place and reduces the friction forces envolved. The ultrasonic oscillations imparted to the spring 14 (FIG. 2) are transmitted to the balls 11 and due to the balls 11 being urged to the spring by the ring 13, the ring acts to provide additional low-frequency oscillations to the balls 11. Therewith, the low-frequency oscillations of the balls 11 are modulated by the ultrasonic oscillations whereby a greater depth of hardening is obtained with lower deformation forces and reduced friction forces. This phenomenon helps invigorate the hardening process and has hithertofore never been applied in surface hardening technology.

The absence of ultrasonic oscillations causes an increase in the resistance of the material being hardened to plastic deformation and in the forces of friction which result in the slippage of the drive belts relative to the pressure rings 13 interrupting the spring treatment process. It is owing to subjecting the spring to ultrasonic oscillations that the entire cross-sectional periphery of a turn of the spring 14 can be processed by the deforming elements E and F to attain uniformly distributed compressive strains and surface roughness of 0.15 mkm.

By adjusting the speed of rotation of the deforming elements E and F, as well as the pressure force exerted by these elements (or by the balls 11) through the replaceable rings 13 (FIG. 2) and the intensity of ultrasonic oscillations of the spring 14, a regular microrelief is obtained having a required degree and depth of the hardened layer on the surfaces of articles shaped as coils. This also affords to attain optimum compressive strains circumferentially of the cross-section of a turn of the spring being surface hardened, which enhances the cyclic strength thereof.

In addition, the ultrasonic oscillations imparted to the spring 14 help detect visually undetectable microcracks on the surface thereof in the course of treatment.

Figure 4:
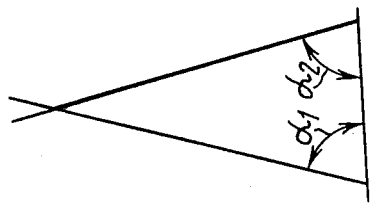
FIG. 4 shows intersecting paths left by deforming elements on the hardened surface of an article when the angular rotational speeds of the deforming elements are equal.
Figure 5:
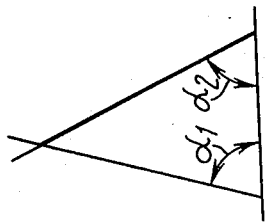
FIG. 5 shows intersecting paths left by the deforming elements on the hardened surface of the article when the angular rotational speeds of these elements are not equal.

A major aspect of the present invention resides in that the deforming elements E and F are rotated in opposite directions; that is, if one deforming element, for example, the element E, describes a right-hand helix on the surface of the turn of the spring being surface hardened, then the other element F rolls on the surface being hardened along a left-hand helical path. As a result, a mesh pattern is formed identical to that obtained during superfinishing or honing. With reference to FIGS. 4 and 5, there are shown elements of intersecting paths from the two groups of balls. As in vibrorolling, a regular microrelief is formed on the processed surface enhancing performance characteristics of the hardened surface, particularly the fatigue strength thereof.

It will be noted that the herein proposed method has much wider capabilities in terms of the geometrical parameters of the microrelief. Shown in FIG. 4 is a pattern of intersection of the ball paths on the hardened surface at equal angular velocities of the deforming elements E and F ($n_1=n_2$ and $\alpha_1=\alpha_2$), whereas FIG. 5 illustrates a different path pattern resulting from different rotational speeds $n_1>n_2(\alpha_1>\alpha_2)$ with different helix angles which changes the mesh pattern formed on the surface. Alternatively, surface hardening at variable rotational speed of the deforming elements is possible whereby by changing the angular rotational velocities $n_1$ and $n_2$ of the deforming elements E and F, as well as by changing the rate n of rotation of the spring 14 such conditions of processing are selected as to obtain desired hardened surface characteristics.

The arrangement of the deforming elements E and F on the opposite sides of the spring 14 is caused by the need to balance the radial forces induced by the drives, which is especially important when processing springs of low rigidity.

For hardening articles of high hardness diamond pieces may be used in the deforming elements E and F instead of the balls 11, whereas for processing elongated articles use can be made of several deforming elements E and F to increase the process efficiency.

In view of the foregoing, the method of hardening by plastic deformation surfaces of articles shaped as continuous helical coils and having essentially round cross-sectional configuration makes it possible:

(1) to obtain a regular surface microrelief which raises the fatigue strength of articles hardened;

(2) to have the article hardened at uniform depth circumferentially and lengthwise of the article;

(3) to reduce surface roughness from 2.5 mkm to 0.15 mkm; and (4) to increase the fatigue strength of the articles thus hardened by 1.5 to 2 times.

What is claimed is:

1. A method of hardening by plastic deformation surfaces of articles shaped as continuous helical coils and having essentially round cross-section by means of deforming elements comprising the steps of arranging said deforming elements at opposite sides of said article for forced rotation in engagement with the surface of the material of said article, rotating said article about its longitudinal centerline and at the same time imparting thereto ultrasonic oscillations, rotating said deforming elements in opposite directions so as to form on the surface of said article a regular microrelief in the form of intersecting mesh-like paths, and by changing the ratio between the angular rotational velocities of said deforming elements providing desired geometrical parameters of the microrelief.

* * * * *